United States Patent
Chen et al.

(10) Patent No.: US 7,562,159 B2
(45) Date of Patent: Jul. 14, 2009

(54) SYSTEMS AND METHODS FOR SELECTIVELY ACTIVATING FUNCTIONS PROVIDED BY A MOBILE PHONE

(75) Inventors: Chia Jung Chen, Taipei Hsien (TW); Shih-Chang Hu, Hsin-Chu (TW); Meng-Feng Lin, Chia-Yi Hsien (TW)

(73) Assignee: Mediatek Inc., Hsin-Chu (TW)

( * ) Notice: Subject to any disclaimer, the term of this patent is extended or adjusted under 35 U.S.C. 154(b) by 232 days.

(21) Appl. No.: 11/457,013

(22) Filed: Jul. 12, 2006

(65) Prior Publication Data

US 2007/0264983 A1 Nov. 15, 2007

Related U.S. Application Data

(60) Provisional application No. 60/745,861, filed on Apr. 28, 2006.

(51) Int. Cl.
*G06F 3/00* (2006.01)
*G06F 13/12* (2006.01)
*G06F 9/445* (2006.01)

(52) U.S. Cl. .............................. 710/8; 710/14; 710/62; 710/72; 717/174; 717/175

(58) Field of Classification Search ..................... 710/8, 710/14, 62, 72; 717/174, 175
See application file for complete search history.

(56) References Cited

U.S. PATENT DOCUMENTS

| | | | | |
|---|---|---|---|---|
| 5,428,341 A * | 6/1995 | Takahashi | .................. | 340/506 |
| 5,594,778 A * | 1/1997 | Schaupp, Jr. et al. | ......... | 455/418 |
| 5,903,852 A * | 5/1999 | Schaupp, Jr. et al. | ......... | 455/564 |
| 6,615,301 B1 * | 9/2003 | Lee et al. | ..................... | 710/106 |
| 6,944,700 B2 | 9/2005 | Bateman et al. | ............. | 710/300 |
| 6,985,754 B1 * | 1/2006 | Pedersen et al. | ......... | 455/556.2 |
| 7,089,031 B1 * | 8/2006 | Pedersen et al. | ......... | 455/550.1 |
| 7,299,267 B1 * | 11/2007 | Pedersen et al. | ............ | 709/217 |
| 2002/0050936 A1 * | 5/2002 | Kato et al. | .................. | 341/100 |
| 2002/0052193 A1 * | 5/2002 | Chetty | ........................ | 455/412 |

(Continued)

FOREIGN PATENT DOCUMENTS

CN 175200 1/2006 .............. 455/67.14

(Continued)

OTHER PUBLICATIONS

"Che-ez! Moni-Me Review" from www.johnvey.com/features/monime, first published in 2004.*

(Continued)

*Primary Examiner*—Henry W. H. Tsai
*Assistant Examiner*—Steven G Snyder
(74) *Attorney, Agent, or Firm*—Thomas, Kayden, Horstemeyer & Risley

(57) ABSTRACT

Methods for selectively activating one of multiple functions provided by a mobile phone are provided. An embodiment of a method for selectively activating one of multiple functions comprises the following steps. The coupling of the mobile phone to a computer system is detected. A first interface is displayed to facilitate selection of a first function from the functions. The selection of the first function is detected by the first interface. At least one software module is configured to activate the first function, thereby the computer system is directed to employ the mobile phone as a first external electronic device corresponding to the first function.

16 Claims, 18 Drawing Sheets

U.S. PATENT DOCUMENTS

| | | | | |
|---|---|---|---|---|
| 2004/0128371 | A1 | 7/2004 | Park et al. | 709/221 |
| 2005/0132352 | A1* | 6/2005 | Shen | 717/174 |
| 2006/0015670 | A1 | 1/2006 | Cinkler et al. | 710/302 |
| 2008/0104284 | A1* | 5/2008 | Chuang | 710/12 |

FOREIGN PATENT DOCUMENTS

| | | |
|---|---|---|
| DE | 10226610 | 1/2003 |
| WO | WO 2007122453 | 11/2007 |

OTHER PUBLICATIONS

"Universal Serial Bus Specification" Revision 2.0, Apr. 27, 2000.*

German Office Action mailed Jul. 26, 2007.

German Office Action, dated Jul. 17, 2008.

China Office Action mailed Nov. 7, 2008.

English Abstract of CN1725200.

* cited by examiner

| Offset | Field | Size | Value | |
|---|---|---|---|---|
| 0 | bLength | 1 | Number | |
| 1 | bDescriptorType | 1 | Constant | |
| 2 | bcdUSB | 2 | BCD | |
| 4 | bDeviceClass | 1 | Class | — F6101 |
| 5 | bDeviceSubClass | 1 | SubClass | — F6102 |
| 6 | bDeviceProtocol | 1 | Protocol | — F6103 |
| 7 | bMaxPacketSize0 | 1 | Number | |
| 8 | idVendor | 2 | ID | — F6104 |
| 10 | idProduct | 2 | ID | — F6105 |
| 12 | bcdDevice | 2 | BCD | |
| 14 | iManufacturer | 1 | Index | |
| 15 | iProduct | 1 | Index | |
| 16 | iSerialNumber | 1 | Index | |
| 17 | bNumConfigurations | 1 | Number | |

FIG. 6a

| Offset | Field | Size | Value |
|---|---|---|---|
| 0 | bLength | 1 | Number |
| 1 | bDescriptorType | 1 | Constant |
| 2 | wTotalLength | 2 | Number |
| 4 | bNumInterfaces | 1 | Number |
| 5 | bConfigurationValue | 1 | Number |
| 6 | iConfiguration | 1 | Index |
| 7 | bmAttributes | 1 | Bitmap |
| 8 | bMaxPower | 1 | mA |

FIG. 6b

| Offset | Field | Size | Value |
|---|---|---|---|
| 0 | bLength | 1 | Number |
| 1 | bDescriptorType | 1 | Constant |
| 2 | wTotalLength | 2 | Number |
| 4 | bNumInterfaces | 1 | Number |
| 5 | bConfigurationValue | 1 | Number |
| 6 | iConfiguration | 1 | Index |
| 7 | bmAttributes | 1 | Bitmap |
| 8 | bMaxPower | 1 | mA |

FIG. 6c

| Offset | Field | Size | Value | |
|---|---|---|---|---|
| 0 | bLength | 1 | Number | |
| 1 | bDescriptorType | 1 | Constant | |
| 2 | bInterfaceNumber | 1 | Number | |
| 3 | bAlternateSetting | 1 | Number | |
| 4 | bNumEndpoints | 1 | Number | |
| 5 | bInterfaceClass | 1 | Class | —F6201 |
| 6 | bInterfaceSubClass | 1 | SubClass | —F6202 |
| 7 | bInterfaceProtocol | 1 | Protocol | —F6203 |
| 8 | iInterface | 1 | Index | |

FIG. 6d

| Offset | Field | Size | Value |
|---|---|---|---|
| 0 | bLength | 1 | Number |
| 1 | bDescriptorType | 1 | Constant |
| 2 | bEndpointAddress | 1 | Endpoint |
| 3 | bmAttributes | 1 | Bitmap |
| 4 | wMaxPacketSize | 2 | Number |
| 5 | bInterval | 1 | Number |

FIG. 6e

SYSTEMS AND METHODS FOR SELECTIVELY ACTIVATING FUNCTIONS PROVIDED BY A MOBILE PHONE

CROSS-REFERENCE TO RELATED APPLICATIONS

The present application relates to U.S. patent applications entitled "CELLULAR PHONE AND PORTABLE STORAGE DEVICE USING THE SAME", Ser. No. 11/240,251, filed Sep. 30, 2005, entitled "CELLULAR PHONE AND PORTABLE STORAGE DEVICE USING THE SAME", Ser. No. 11/242,420, filed Sep. 30, 2005 and entitled "METHODS AND SYSTEMS FOR AUDIO AND VIDEO COMMUNICATION", Ser. No. 11/332,763, filed Jan. 13, 2006. The present application claims the benefit of U.S. provisional patent application entitled "SYSTEMS AND METHODS FOR SELECTIVELY ACTIVATING FUNCTIONS PROVIDED BY A MOBILE PHONE", Ser. No. 60/745,861, filed Apr. 28, 2006.

BACKGROUND

The invention relates to mobile phones, and more particularly, to systems and methods for selectively activating functions provided by a portable device.

Mobile phones are typically equipped with mass storage devices such as flash memory, digital cameras, transmission devices and others, to provide various functions. These embedded devices may be accessed by an electronic device such as a computer, a personal digital assistant (PDA), a programmable consumer electronic device or similar.

SUMMARY

Methods for selectively activating one of multiple functions provided by a portable device are provided. An embodiment of a method for selectively activating one of the multiple functions comprises the following steps. The coupling of the portable device to a computer system is detected. A first interface is displayed to facilitate selection of a first function. The selection of the first function via the first interface is detected. At least one software module is configured to activate the first function, thereby directing the computer system to employ the portable device as a first external electronic device corresponding to the first function.

Apparatuses for selectively activating one of multiple functions are provided. An embodiment of an apparatus for selectively activating one of multiple functions comprises a connection device, a display and a processing unit. The processing unit coupling to the display and the connection device detects that the apparatus has been coupled to a computer system via the connection device, displays a first interface on the display to facilitate selection of a first function from the functions, detects that the first function is selected via the first interface, and configures at least one software module executed therein to activate the first function, thereby directing the computer system to employ the apparatus as a first external electronic device corresponding to the first function.

Systems for selectively activating one of multiple universal serial bus (USB) functions are provided. An embodiment of a system for selectively activating one of multiple USB functions comprises a USB controller, a USB connector, a USB data line and a regulator. The USB data line connects the USB controller to the USB connector. The regulator disposed between a power source and the USB data line receives an enabling signal from the processing unit, and selectively converts the power source to a predetermined voltage level according to the enabling signal. A connection signal indicating that a USB device has been plugged in is transmitted when converting the power source to the predetermined voltage level, and a disconnection signal indicating that the USB device has been removed is transmitted when not converting the power source to the predetermined voltage level.

BRIEF DESCRIPTION OF THE DRAWINGS

The present invention can be more fully understood by reading the subsequent detailed description and examples with references made to the accompanying drawings, wherein:

FIG. 6a is a diagram of the data structure of an exemplary device descriptor;

FIG. 6b is a diagram of the data structure of an exemplary configuration descriptor;

FIG. 6c is a diagram of the data structure of an exemplary other_speed_configuration descriptor;

FIG. 6d is a diagram of the data structure of an exemplary interface descriptor;

FIG. 6e is a diagram of the data structure of an exemplary endpoint descriptor;

DETAILED DESCRIPTION

Figure 1:
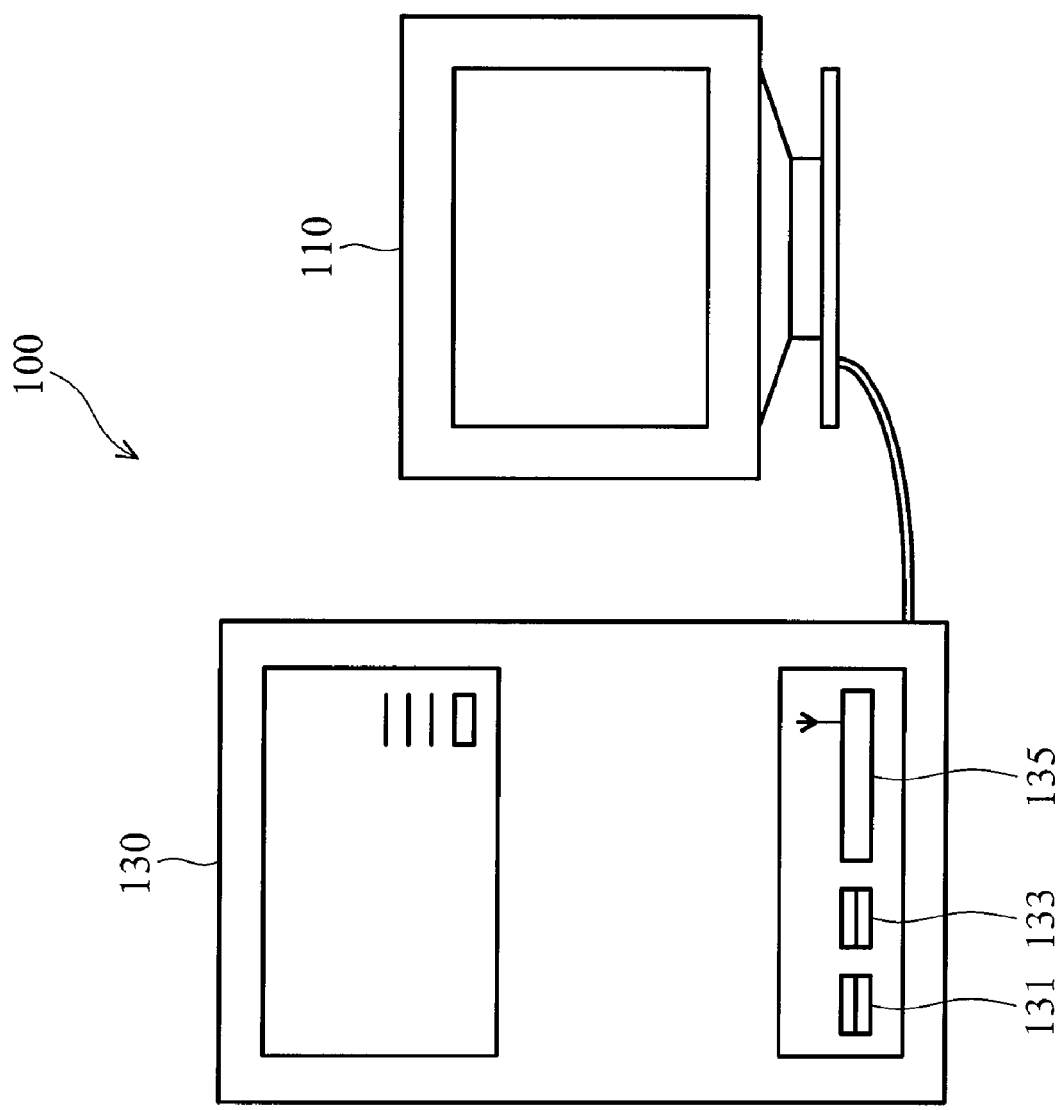
FIG. 1 is a diagram of an embodiment of a computer system.

FIG. 1 is a diagram of an embodiment of a computer system 100 comprising a display 110 and a computer host 130. The computer host 130 is typically equipped with at least one connection port such as 131 and 133 or at least one wireless transceiver 135 capable of coupling to a mobile phone. The connection port may be a serial port or a parallel port. A serial port, such as a RS232, RS242, Serial ATA (SATA), Universal Serial Bus (USB), IEEE 1394 or Universal Asynchronous Receiver Transmitter (UART) port or similar, is an interface on a computer system by which information is transferred in or out one bit at a time. A parallel port, such as an Integrated Drive Electronics (IDE), Small Computer System Interface (SCSI), IEEE 1284 port or similar, is an interface on a computer system which enables data to be transferred in or out in parallel, that is, on more than one wire. A parallel port carries one bit on each wire thus multiplying the transfer rate obtainable over a single cable (contrast serial port). There are usually several extra wires on the parallel port that are used for control signals to indicate when data is ready to be sent or received. A wireless transceiver, such as an 802.x, Bluetooth or Infrared Data Association (IrDA) transceiver or similar, is an interface on a computer system by which information is transferred by radio frequency or infrared signals or similar. Moreover, those skilled in the art will understand that some embodiments of the computer 100 may be practiced with other computer system configurations, including handheld devices, multiprocessor-based, microprocessor-based or programmable consumer electronics, notebooks and the like.

Figure 2A:
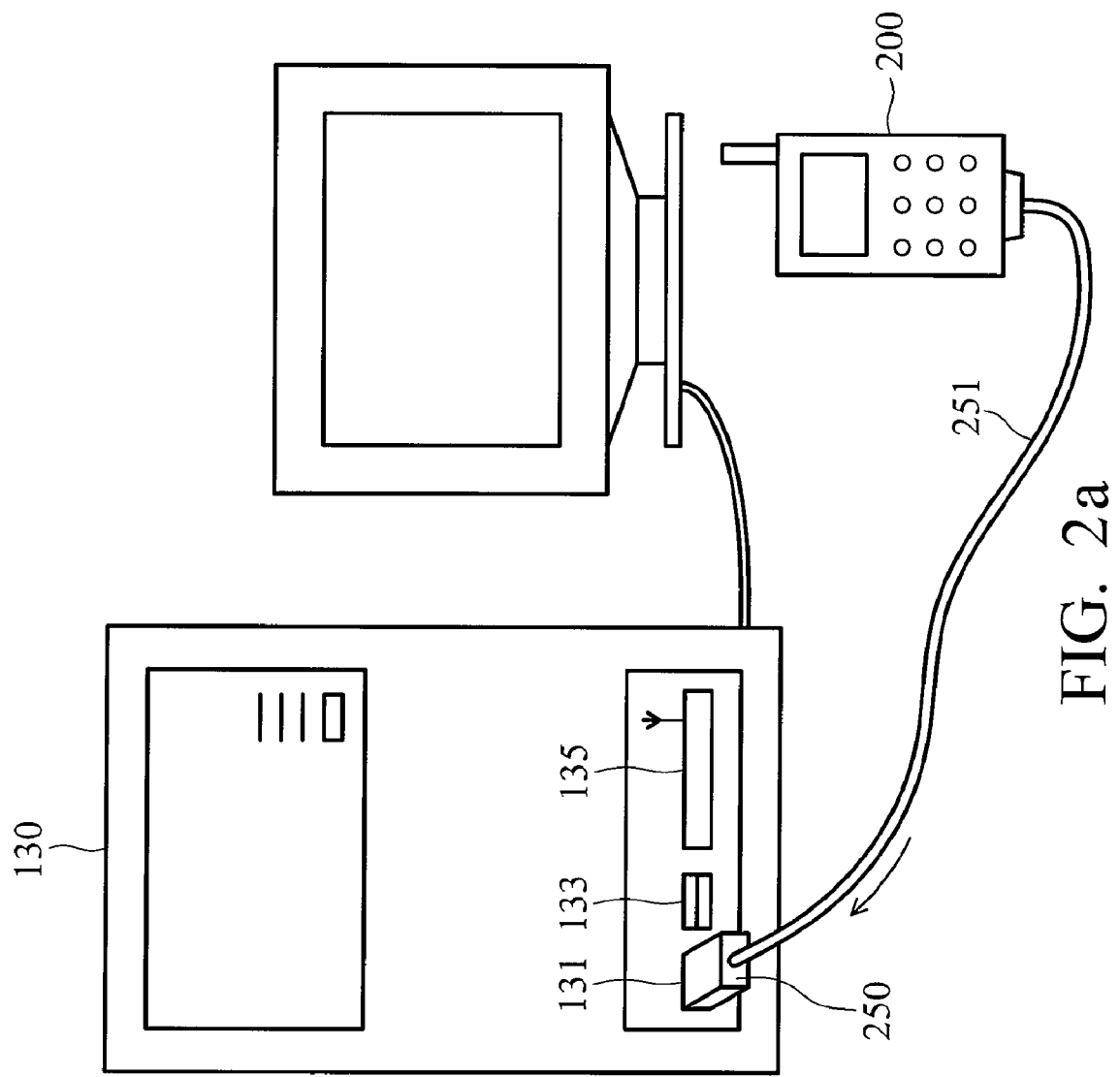
FIG. 2a is a diagram of an embodiment of a mobile phone connecting to a computer host.
Figure 2B:
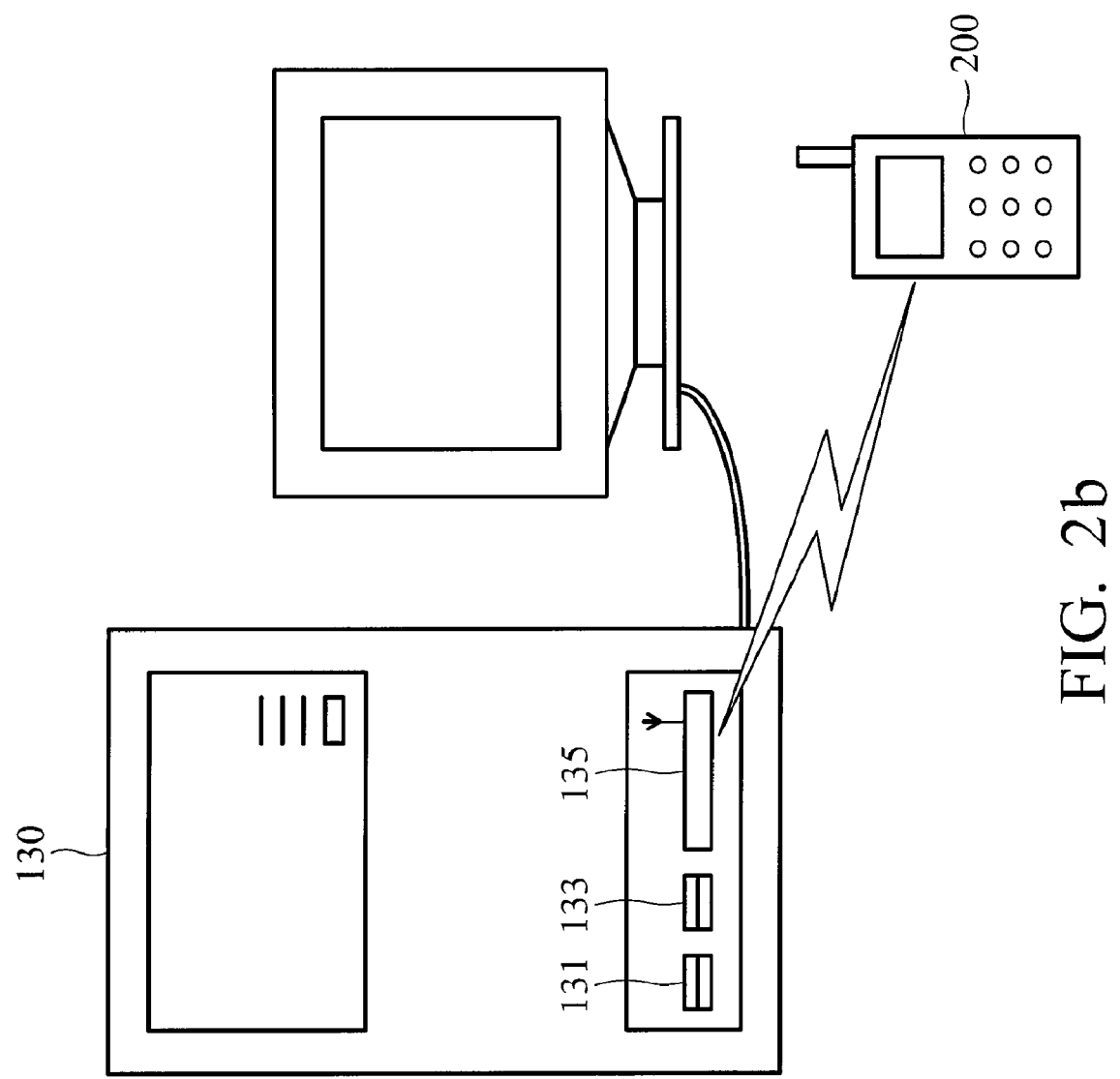
FIG. 2b is a diagram of an embodiment of a mobile phone coupling to a computer host.

FIG. 2a is a diagram of an embodiment of the mobile phone 200 connecting to the computer host 130 via a connector 250, a connection wire 251 and the connection port 131. FIG. 2b is a diagram of an embodiment of the mobile phone 200 coupling to the computer host 130 by associating with the wireless transceiver 135. When the mobile phone 200 couples to the computer host 130 via the connection port 131 or the wireless transceiver 135, the computer host 130 may identify and configure the mobile phone 200 as an external mass storage device, a virtual comport device, a mobile TV receiver or the combination of at least two of the above, by employing the universal plug and play (UPnP) protocol set forth by the UPnP forum. For example, the mobile phone 200 may be configured as a combined device of a virtual comport device plus a mass storage device. When the mobile phone 200 operates as a virtual comport device, software applications resident on the computer host 130 communicate with the mobile phone 200 therebetween through the conventional RS-232 interface. At the same time, the mobile phone 200 operates as a mass storage device, and the computer host 130 can read/write data from/to a non-volatile storage device of the mobile phone 200. Therefore, the computer host 130 can perform various functions provided by the mobile phone 200, such as reading/writing data from/to a non-volatile storage device of the mobile phone 200 (mass storage function), receiving digital TV data via the mobile phone 200, connecting to an internet via the mobile phone 200 (comport function) and others. The mobile phone 200 may be equipped with a TV tuner (not shown), a video decoder (not shown), an audio processor (not shown) and a teletext processor (not shown) to receive digital TV data. The mobile phone 200 may lock on to a frequency by the TV tuner (not shown), and acquire video, audio and teletext data carried by the locked frequency via the video decoder (not shown), the audio processor (not shown) and the telextext processor (not shown). In addition, the mobile phone 200 may be equipped with a Bluetooth transceiver (not shown). An electronic device (not shown) equipped with a Bluetooth transceiver may exchange data between the computer host 130 and itself via the mobile phone 200.

Figure 3:
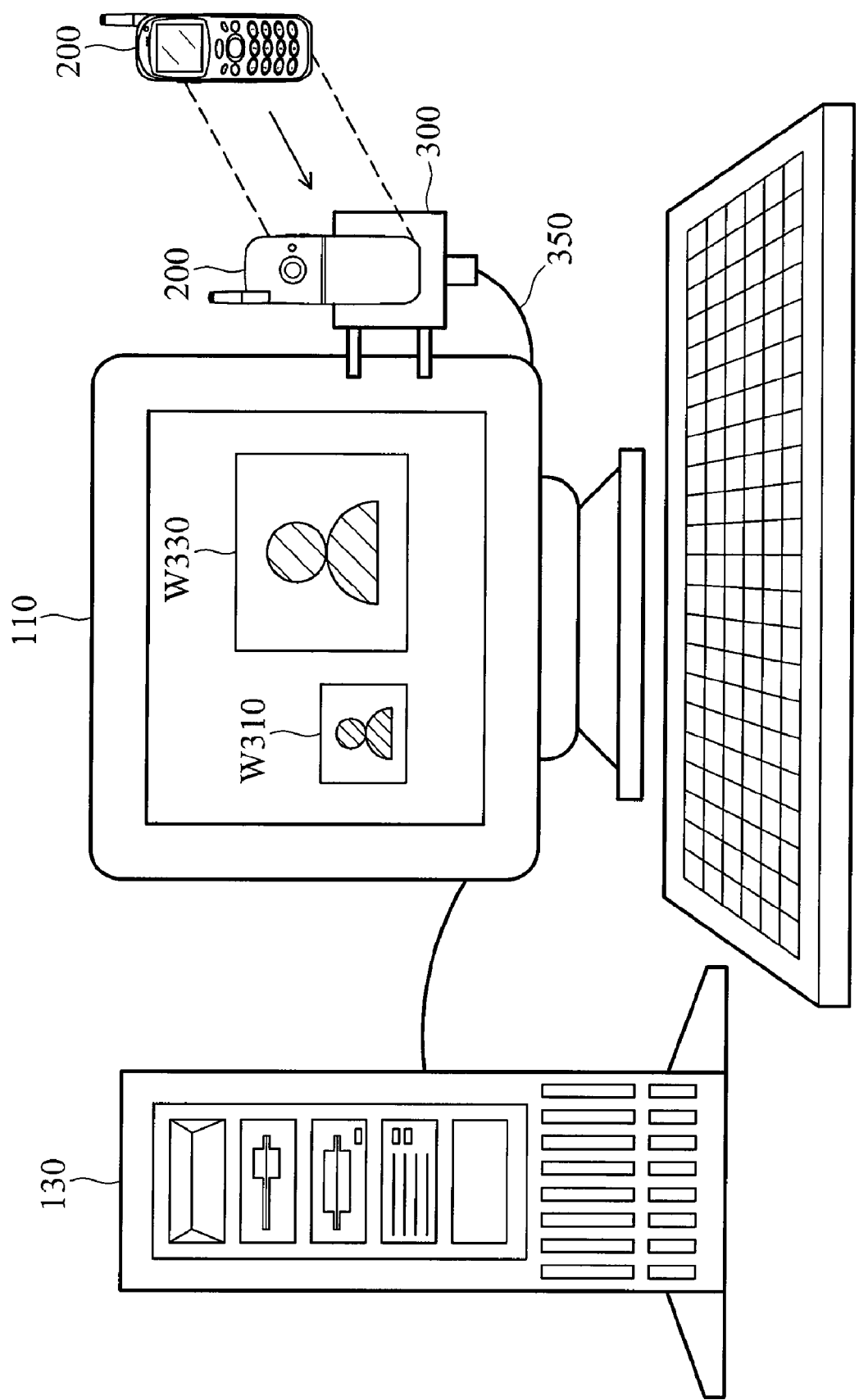
FIG. 3 is a diagram of an embodiment of a mobile phone installed in a base, which provides Web camera (webcam) functions.

Moreover, FIG. 3 is a diagram of an embodiment of the mobile phone 200 installed in a base 300, which provides a Web camera (webcam) function. The mobile phone may be equipped with an image sensor module (not shown) and an image signal processor (ISP, not shown). The image sensor module (not shown) may comprise multiple charge couple device (CCD) image sensors, complementary metal oxide semiconductor (CMOS) image sensors or similar to record the intensity of light as variable charges. In order to convert the content of the image sensor module (not shown) to a digital format, the ISP (not shown) may quantify the variable charge into a discrete number of colors. A bitmap image contains numerous pixel data quantified by the ISP (not shown) in a given resolution such as 640×480, 1024×768 and so on. The bitmap image may be further converted into a compressed format by an image encoder such as a Joint Photographic Experts Group (JPEG) encoder (not shown), Graphics Interchange Format (GIF) encoder (not shown) or similar to generate a compressed image such as a JPEG, GIF image or similar. The bitmap images may be encoded by a Moving Pictures Experts Group-4 (MP4) encoder (not shown) or similar to generate a series of encoded frames such as I-, P- and B-frames. The generated display objects such as bitmap, JPEG, GIF images, I-, P-, B-frames or others, are continuously and serially transmitted to the computer host 130. The base 300 is provided to support the mobile phone 200 and enable easy placement in a relevant place to facilitate focusing on and capturing images of a user by the mobile phone 200. The base 300 and computer host 130 may provide various connection ports such as the described serial ports or parallel ports, for connection therebetween via wires 350. Webcam software executed by the computer host 130 may provide two windows W310 and W330 for live image display, the window W330 displaying images showing a remote user, and the window W310 displaying images showing a user captured by the mobile phone 200. The windows W310 and W330 may be handled by a peer-to-peer (P2P) communication application such as Microsoft MSN Messenger, Yahoo! Messenger, Skype or similar to interact with a corresponding P2P communication application resident on a remote computer host.

Figure 4A:
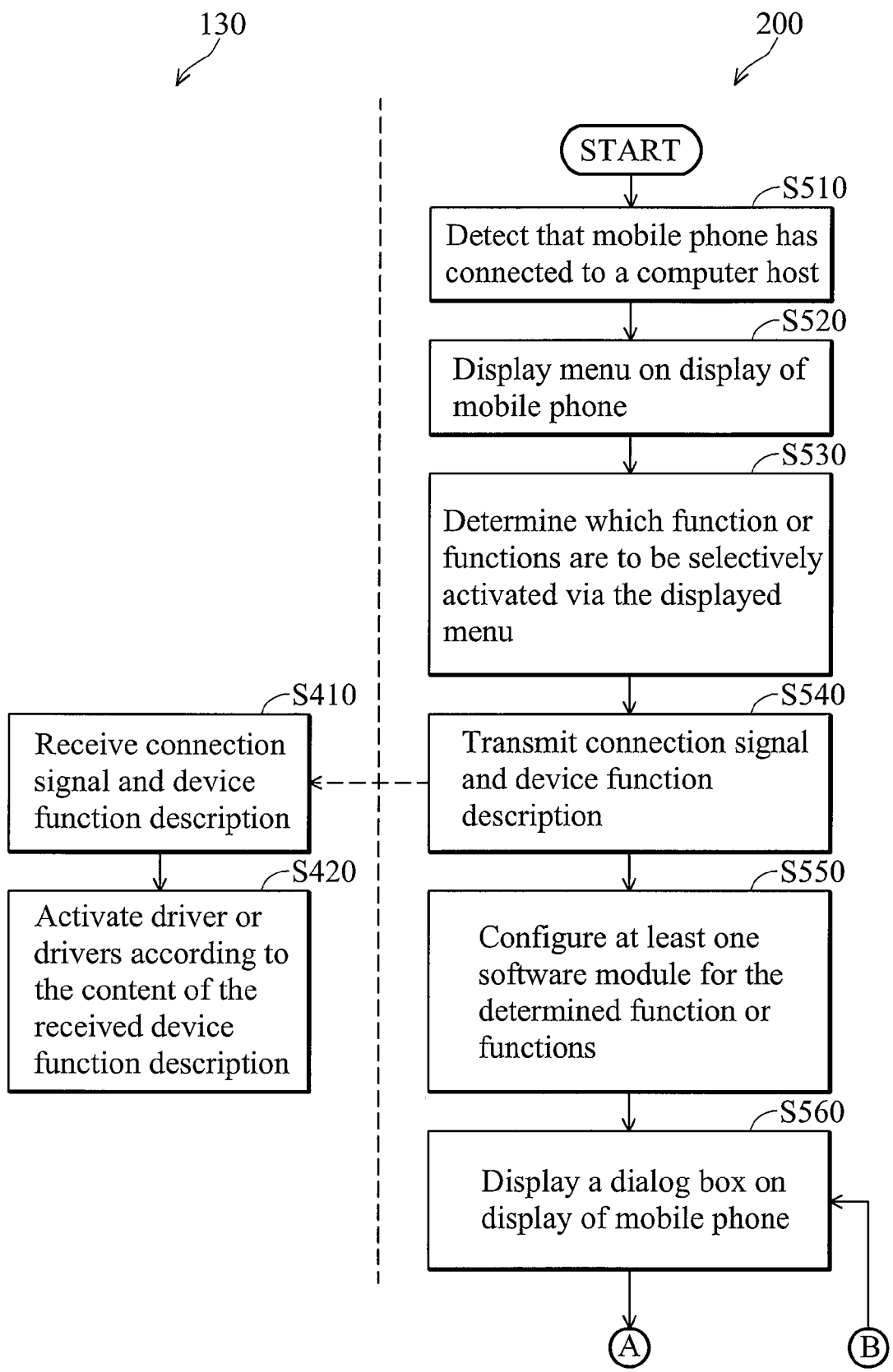
FIGS. 4a and 4b are flowcharts illustrating an embodiment of a method for selectively activating functions provided by a mobile phone.
Figure 4B:
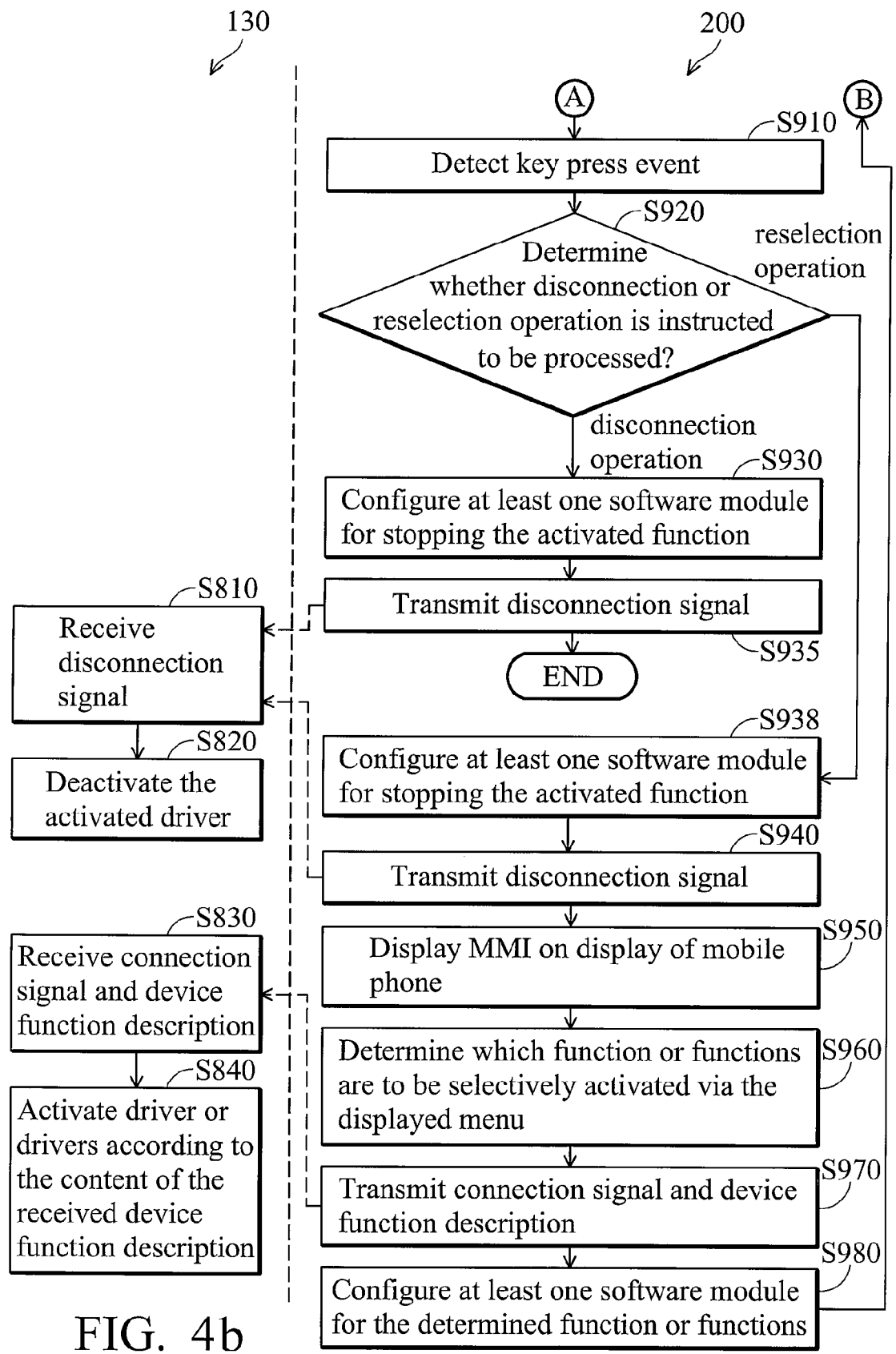
Figure 5:
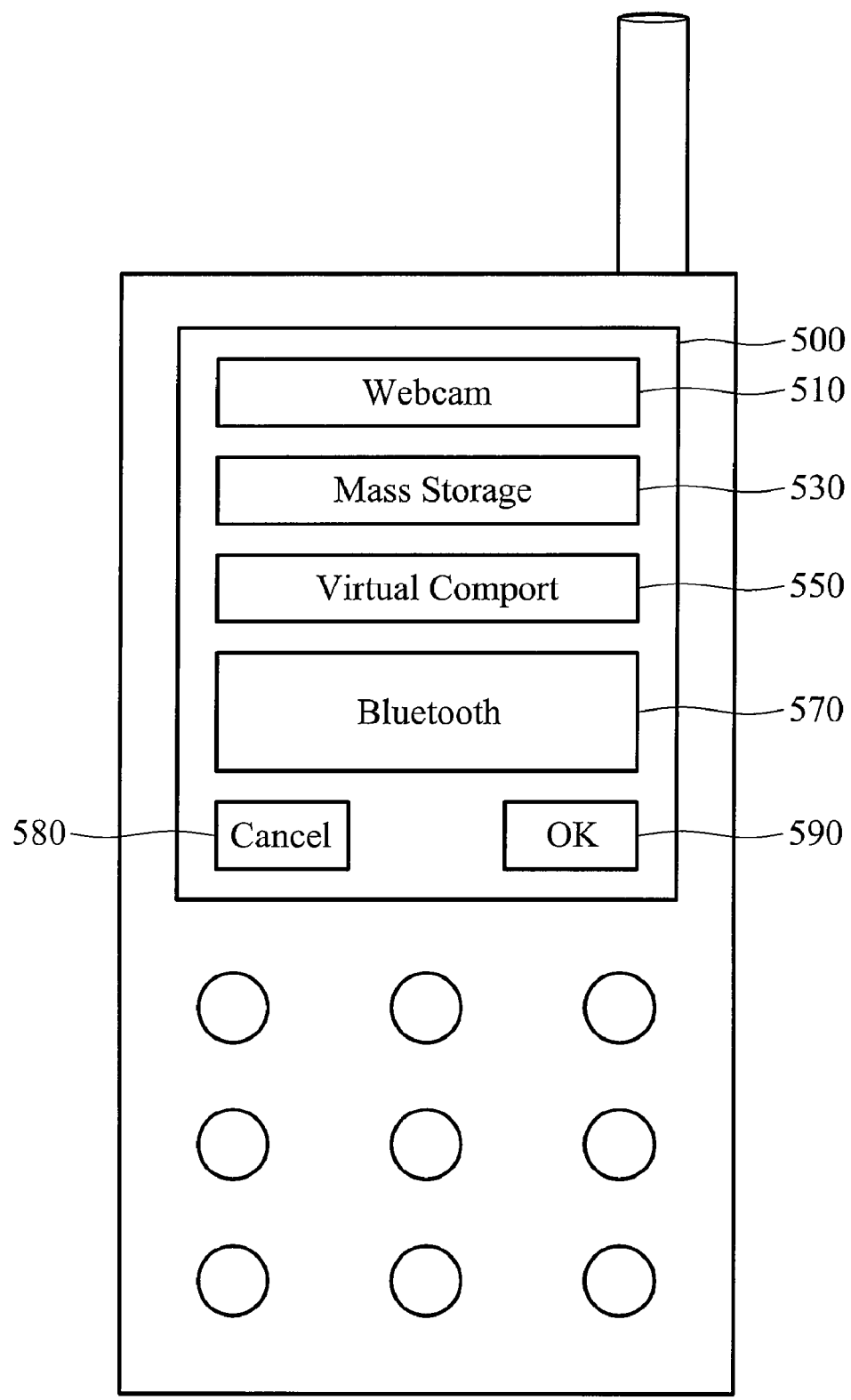
FIG. 5 is a diagram of an exemplary man-machine interface (MMI) of a menu.

FIGS. 4a and 4b are flowcharts illustrating an embodiment of a method for selectively activating functions provided by a mobile phone, divided into two sections, a left section showing steps performed by a computer host (e.g. 130 of FIG. 3a or 3b), and a right section showing steps performed by a mobile phone (e.g. 200 of FIG. 3a or 3b), separated by dashed lines for added clarity. That the mobile phone has been coupled to the computer host is detected (step S510 of FIG. 4a). For example, that the mobile phone has been connected to the computer host is detected by detecting high voltage at pin $V_{Bus}$ of a USB connector (i.e. a USB link). An MMI (Man-Machine Interface) facilitating user determination of one function or combination of at least two functions from multiple predefined functions to be activated is displayed on a display of the mobile phone (step S520 of FIG. 4a). FIG. 5 is a diagram of an exemplary MMI of a menu 500 containing four menu items 510 to 570 and two soft keys 580 and 590. The menu items 510 to 570 respectively display text prompts "Webcam", "Mass storage", "Virtual comport" and "Bluetooth" It is determined which function or functions are to be selectively activated via the displayed menu (step S530 of FIG. 4a).

For example, when "Webcam" and "Mass storage" functions are selectively activated via the displayed menu, the mobile phone 200 may be configured as a combined device of a Webcam plus a mass storage device. Therefore, the computer host 130 can read/write data from/to a non-volatile storage device of the mobile phone 200, operating the mobile phone 200 as an external mass storage device, and receive the images captured by the camera module of the mobile phone 200, operating the mobile phone 200 as a Webcam.

Referring to FIG. 4a, connection signal and device function description are transmitted from the mobile phone (step S540 of FIG. 4a), and are received by the computer host (step S410 of FIG. 4a). The connection signal is utilized to notify the computer host that an electronic device (i.e. the mobile phone) has been connected. The device function description may contain profile information indicating a vendor identity, product identity, device description, interface identity, or similar for configuring the mobile phone. Moreover, the device function description contains driver identity or identities corresponding to the determined function or functions (as shown in step S530 of FIG. 4a). The driver or drivers corresponding to the received driver identity or identities and resident on the computer host are activated according to the content of the received device function description (step S420 of FIG. 4a). It is to be understood that the activated driver may be a public driver provided by a software vendor of an OS such as Window 2000™, Windows XP™, Linux, or similar, or may be a native driver provided by a manufacturer of the mobile phone. The public driver is automatically installed when the OS is installed in the computer host. When installing the native driver in the computer host, additional download/load effort for the native driver from a Web site on the Internet, an optical disc, a portable drive or similar, may be required.

Figure 7:
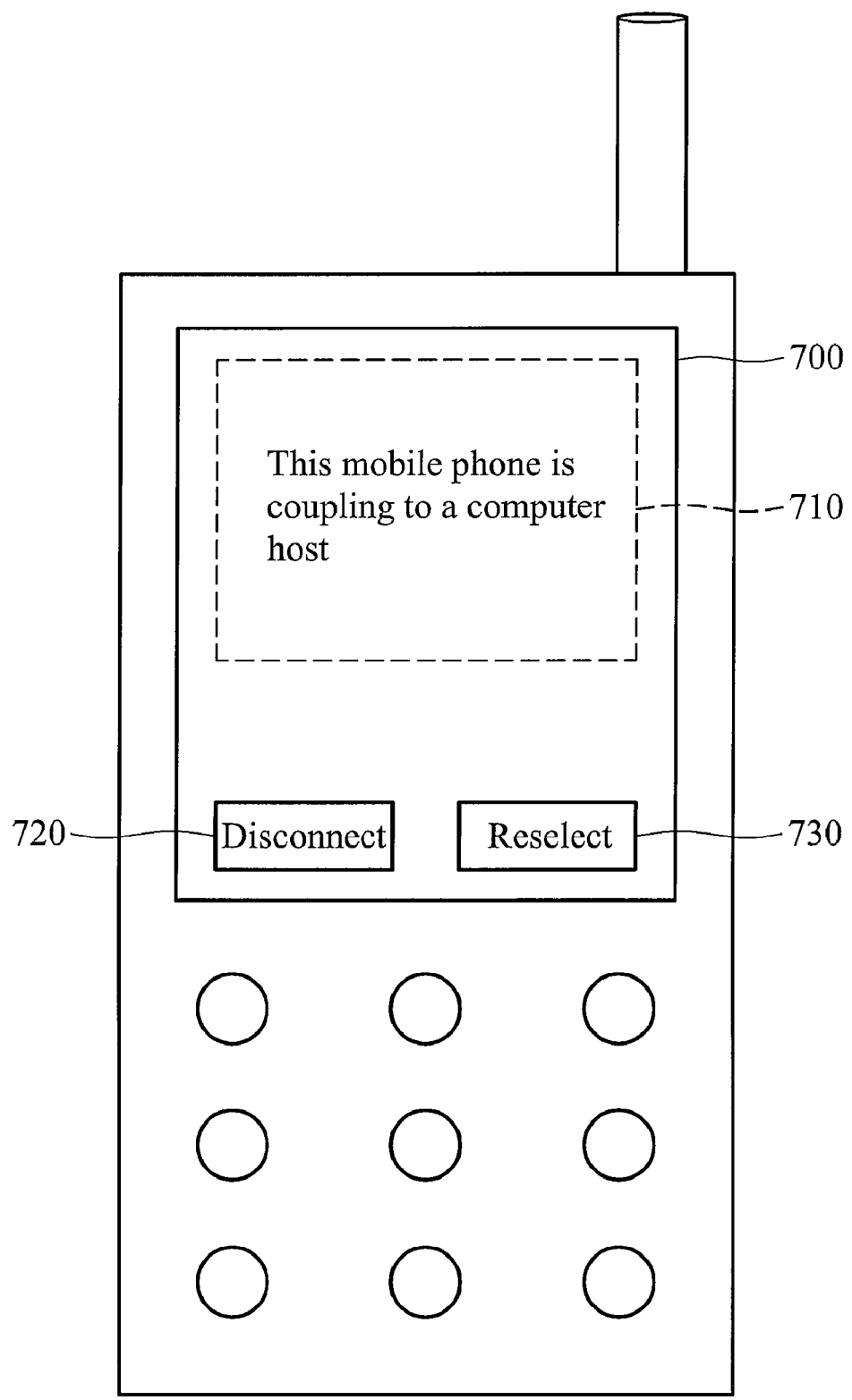
FIG. 7 is a diagram of an exemplary MMI of a dialog box

After transmitting the device function description (step S540 of FIG. 4a), at least one software module such as a command processing engine, a file system driver, an image signal processor (ISP) driver, or similar, resident on the mobile is configured for the determined function or functions (step S550 of FIG. 4a). After successfully executing steps S550 and S420, the computer host may employ the coupled mobile phone as an external mass storage, a virtual comport, a Webcam or another external electronic device. Details of data communication between the computer host and the coupled mobile phone are well-known in the art and briefly described herein. Moreover, a dialog box is displayed on a display of the mobile phone (S560 of FIG. 4a), facilitating disconnection from the computer host or reactivation of another function or functions by a user. FIG. 7 is a diagram of an exemplary MMI of a dialog box 700 containing a prompt message 710 and two soft keys 720 and 730. The prompt message 710 indicates that the mobile phone is coupling to a computer host. It is determined whether a user desires to disconnect the current connection or reselect a function or functions. For example, it is determined that a user desires to disconnect the current connection when a hard key corresponding to the soft key 720 is pressed, otherwise, a user desires to reselect a function or functions when a hard key corresponding to the soft key 730 is pressed.

A key press event associated with one hard key corresponding to the soft key 720 or 730 is detected (S910 of FIG. 4b). It is determined whether a disconnection or reselection operation is instructed to be processed (S920 of FIG. 4b). When a disconnection operation is instructed, the mobile phone proceeds to configure at least one software module resident on mobile phone for stopping the activated function (S930 of FIG. 4b), opposite to the previously executed step S550 of FIG. 4a which configures the at least one software module for activating the function, and transmit a disconnection signal to the computer host (S935 of FIG. 4b) When a reselection operation is instructed, the mobile phone proceeds to configure at least one software module resident on mobile phone for stopping the activated function (S938 of FIG. 4b), opposite to the previously executed step S550 of FIG. 4a which configures the at least one software module for activating the function, and transmit a disconnection signal to the computer host (S940 of FIG. 4b). The disconnection signal is utilized to notify the computer host that a coupled electronic device (i.e. the mobile phone) has been uncoupled. After receiving the disconnection signal (S810 of FIG. 4b), the computer host deactivates the activated driver (S820 of FIG. 4b). After transmitting the disconnection signal, the mobile phone proceeds to perform steps S950 to S980 of FIG. 4b for the reselection operation. Details of steps S950 to S980 are similar to steps S520 to S550, and are briefly described herein. Also, details of steps S830 and S840 of FIG. 4b are similar to steps S410 and S420 of FIG. 4a, and are briefly described herein.

Referring to steps S540 and S410 of FIG. 4a, and steps S960 and S840 of FIG. 4b, the device function description is preferably carried by multiple descriptors such as "device", "configuration", "other_speed_configuration", "interface" and "endpoint" descriptors set forth by universal serial bus specification revision 2.0 on Apr. 27, 2000. The device descriptor may describe general information about the coupled mobile phone (e.g. 200 of FIG. 3a or 3b). FIG. 6a is a diagram of the data structure of an exemplary device descriptor containing fourteen fields. For an example, when activating the described mass storage function (S530 of FIG. 4), three fields "bDeviceClass" F6101, "bDeviceSubClass" F6102 and "bDeviceProtocol" F6103 are set to a preserved value "0x00." For another example, when activating the described virtual comport function (S530 of FIG. 4), the described fields F6101 to F6103 are respectively set to preserved values "0x02", "0x00" and "0x00." The configuration descriptor describes information about configurations for the coupled mobile phone. FIG. 6b is a diagram of the data structure of an exemplary configuration descriptor containing eight fields. The mobile phone may provide more than one configuration descriptor to the computer host, and each configuration descriptor may describe a number of interfaces. The other_speed_configuration descriptor describes a configuration of a high speed capable device, being identical to a configuration descriptor. FIG. 6c is a diagram of the data structure of an exemplary other_speed_configuration descriptor containing eight fields. The interface descriptor describes a specific interface within a configuration. FIG. 6d is a diagram of the data structure of an exemplary interface descriptor containing nine fields. In one example, when activating the described mass storage function (S530 of FIG. 4), three fields "bInterfaceClass" F6201, "bInterfaceSubClass" F6202 and "bInterfaceProtocol" F6203 are respectively set to preserved values "0x08", "0x06" and "0x50." The interface and device descriptor described above indicates that the coupled mobile phone supports the standard mass storage interface. In another example, when activating the described virtual comport function (S530 of FIG. 4), two interface descriptors are necessary provided. In one interface descriptor, the described fields F6201 to F6203 are respectively set to preserved values "0x02", "0x02" and "0x00", moreover, in the other interface descriptor, the described fields F6201 to F6203 are respectively set to preserved values "0x0a", "0x00" and "0x00." The interface and device descriptor described above indicates that the coupled mobile phone supports these two standard virtual comport interface. Each interface descriptor may associate with zero or more endpoint descriptors. The endpoint descriptor contains information required by the computer host to determine the bandwidth requirements of each endpoint. FIG. 6e is a diagram of the data structure of an exemplary endpoint descriptor containing six fields.

Figure 8:
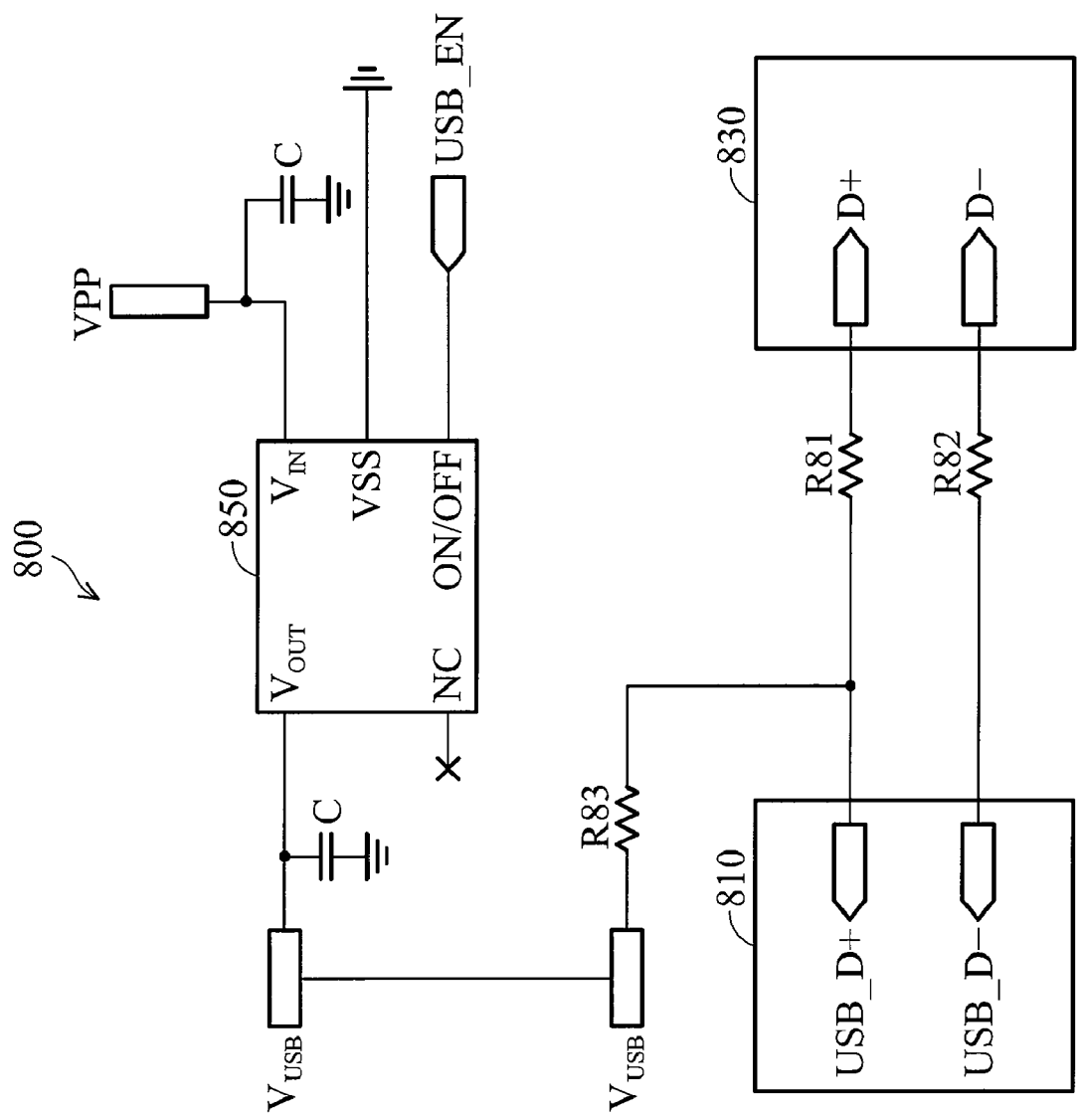
FIGS. 8 to 13 are diagrams of embodiments of a universal serial bus (USB) system.

When the mobile phone connects to the computer host via the USB link, the mobile phone further contains a connection control device to generate the described connection and disconnection signals as shown in steps S540 and S410 of FIG. 4a, and steps S970 and S830 of FIG. 4b. FIG. 8 is a diagram of a first embodiment of a USB system 800 comprising a USB controller 810, an external USB connector 830 (referring to 250 of FIG. 2a) and a regulator 850. In some embodiments, the regulator 850 may be a power unit embodied in a power management integrated circuit (PMIC). The USB data lines D+ and D− are connected between the USB controller 810 and the external USB connector 830 through resistors R81 and R82 for matching of the characteristic impedance of 90Ω±15%. Those skilled in the art will realize that the matching resistors R1 and R2 are disposed closer the USB controller 810 than the external USB connector 830. The data line D+ may be pulled high to $V_{USB}$ (3.3V) through a resistor R83, preferably 1.5KΩ. The regulator 850 is disposed between power source VPP and the resistor R83, selectively converting the VPP into the $V_{USB}$ or not according to an enabling signal USB_EN. When the enabling signal USB_EN is set to high (i.e. enabling USB device), the regulator 850 converts the VPP into the $V_{USB}$, thereby the computer host (e.g. 130 of FIG. 2a) to recognize that a full-speed USB device (e.g. 200 of FIG. 2a) has been plugged in. Otherwise, when the enabling signal USB_EN is set to low (i.e. disabling USB device), the regulator 850 does not convert the VPP to $V_{USB}$, thereby the computer host (e.g. 130 of FIG. 2a) recognizes that a connected full-speed USB device (e.g. 200 of FIG. 2a) has been removed. Referring to steps S540 of FIG. 4a and S970 of FIG. 4b, the connection signal may be generated by setting the enabling signal USB_EN to high. Referring to steps S940 of FIG. 4b, the disconnection signal may be generated by setting the enabling signal USB_EN to low. It is to be understood that the disconnect signal is generated by setting the enabling signal.

It is understood by the skilled in the art, when the mobile phone is connected to the computer host by plugging in the USB device, the connection signal is sent to the computer host and some software modules are configured to be activated, and when the mobile phone is disconnected from the computer host by plugging out the USB device, the disconnection signal is sent to the computer host and some software modules are configured to be stopped. In the S920 of FIG. 4, when the user directly plugs out the USB device of the mobile phone from the computer host or when the user presses the hard key corresponding to the soft key "Disconnect" 720 of FIG. 7 without the plugging-out, the disconnection operation is determined, and the disconnection signal is sent to the computer host so as to stop some software modules, disabling the predetermined function. In the S920 of FIG. 4, when the user directly plugs out and then re-plugs in the USB device of the mobile phone or when the user presses the hard key corresponding to the soft key "Reselect" 730 of FIG. 7 without the plugging-out and re-plugging in, the reselection operation is determined, and the disconnection signal is sent to the computer host so as to stop some software modules, disabling the predetermined function, and then the connection signal is sent to the computer host so as to activate some other software modules, enabling another predetermined function.

Figure 9:
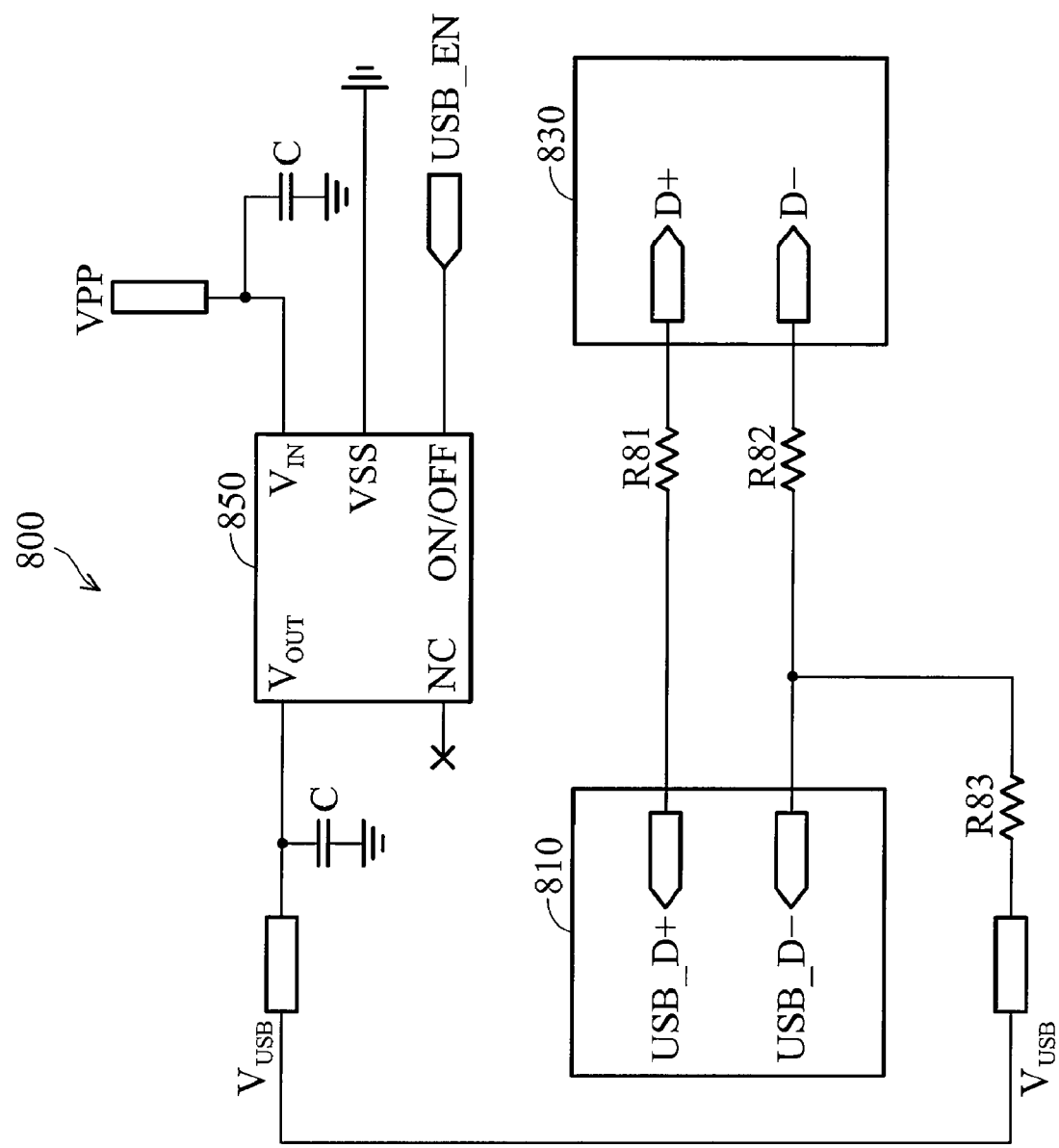

FIG. 9 is a diagram of a second embodiment of the USB system 800. The differences from the first embodiment are described in the following. The data line D− may be pulled high to $V_{USB}$ (3.3V) through a resistor R83, preferably 1.5KΩ. When the enabling signal USB_EN is set to high (i.e. enabling USB device), the regulator 850 converts the VPP to the $V_{USB}$, thereby the computer host (e.g. 130 of FIG. 2a) recognizes that a low-speed USB device (e.g. 200 of FIG. 2a) has been plugged in. Otherwise, when the enabling signal USB_EN is set to low (i.e. disabling USB device), the regulator 850 does not convert the VPP to the $V_{USB}$, thereby the computer host (e.g. 130 of FIG. 2a) recognizes that a connected low-speed USB device (e.g. 200 of FIG. 2a) has been removed.

Figure 10:
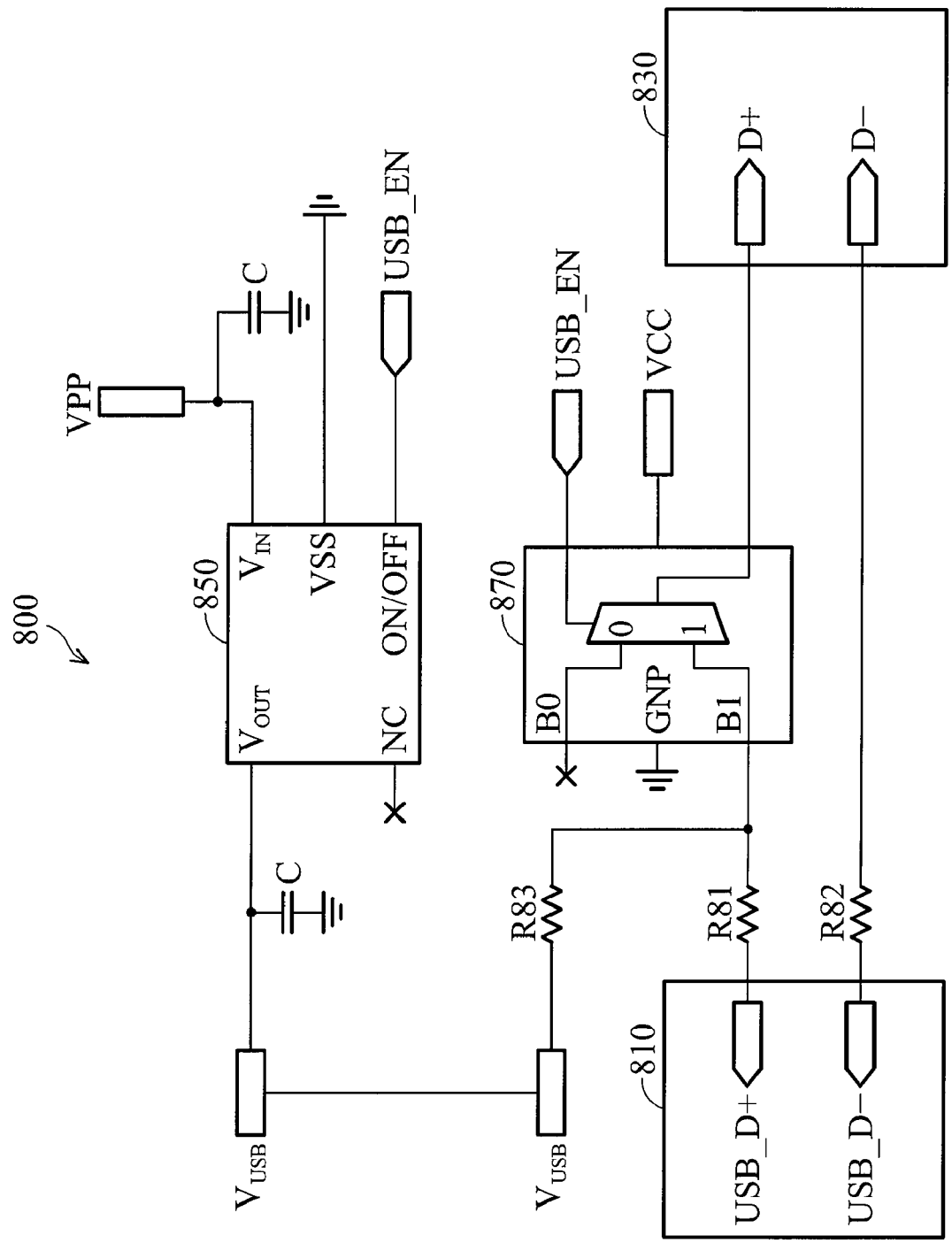
Figure 11:
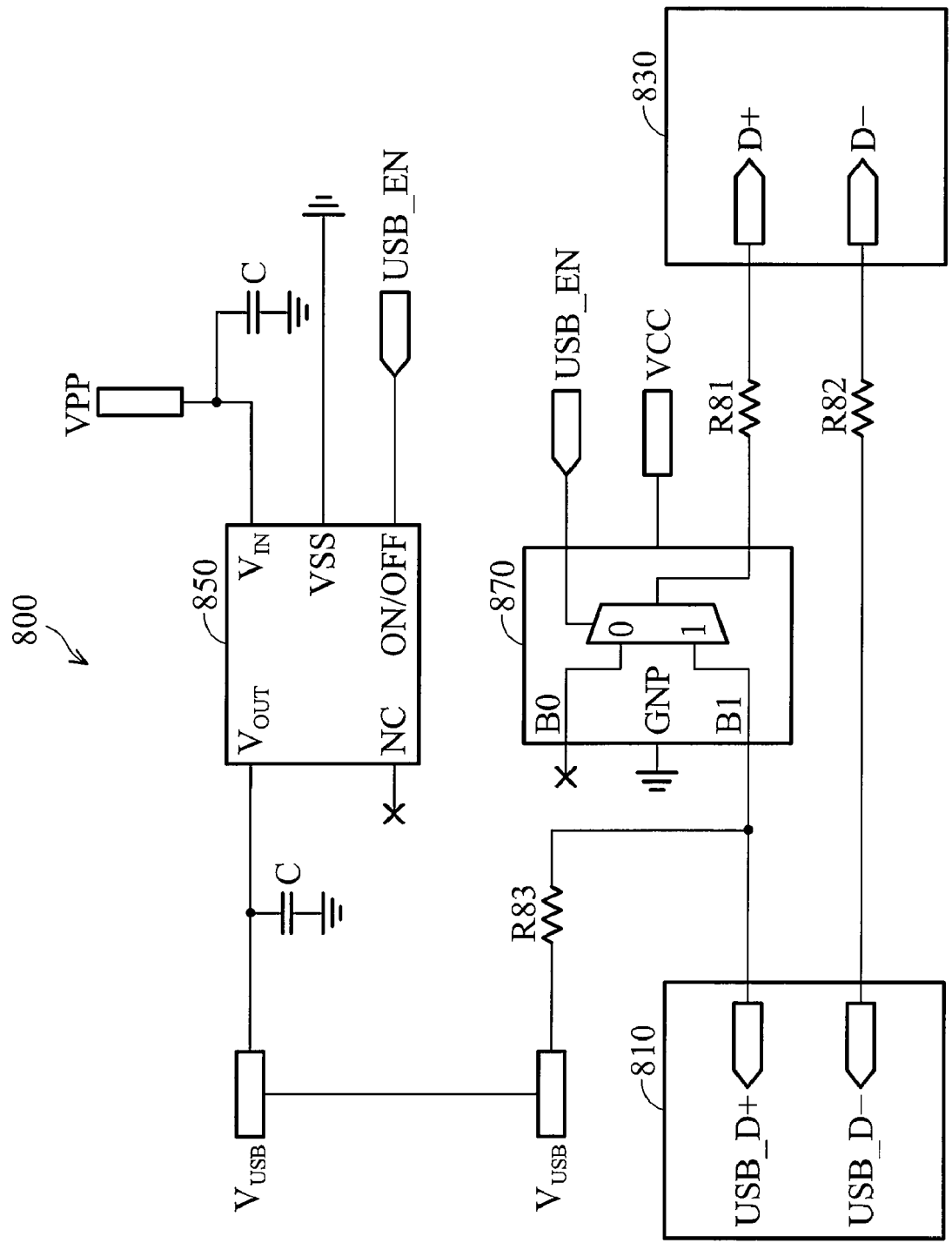

FIG. 10 is a diagram of a third embodiment of the USB system 800 further containing a switching device 870. The differences from the first embodiment are described in the following. The switching device 870, preferably a multiplexer or an analog switch, is disposed between the USB controller 810 and the USB external connector 830, and selectively connects and disconnects the data line D+ according to an enabling signal USB_EN. When the enabling signal USB_EN is set to high (i.e. enabling USB device), the switching device 870 connects the data line D+, thereby the computer host (e.g. 130 of FIG. 2a) to recognize that a full-speed USB device (e.g. 200 of FIG. 2a) has been plugged in. When the enabling signal USB_EN is set to low (i.e. enabling USB device), the switching device 870 disconnects, thereby the computer host (e.g. 130 of FIG. 2a) to recognize that a connected full-speed USB device (e.g. 200 of FIG. 2a) has been removed. FIG. 11 is a diagram of a fourth embodiment of the USB system 800. In the fourth embodiment, the switching device 870 and the resistor R83 are combined into the controller side.

Figure 12:
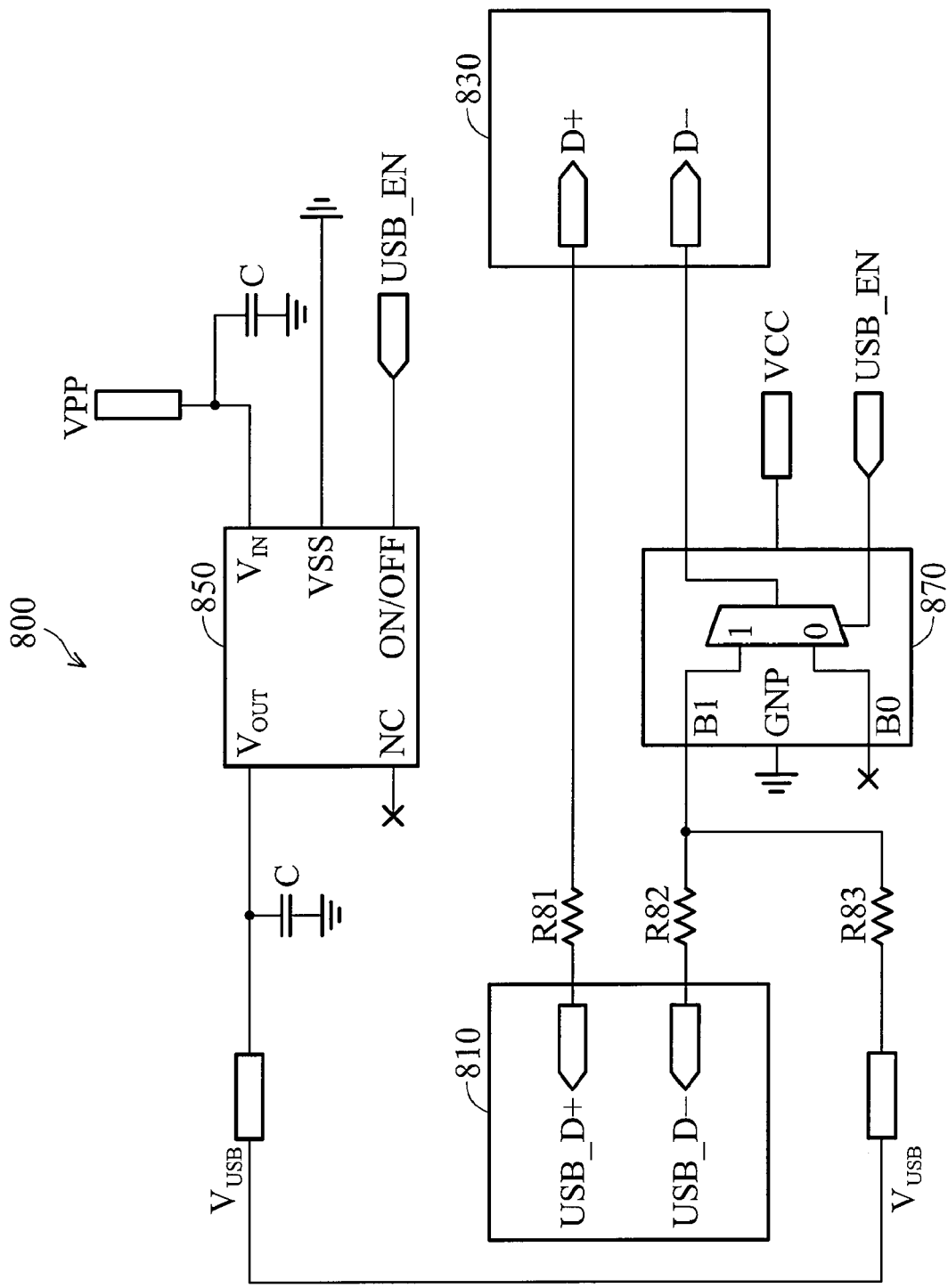
Figure 13:
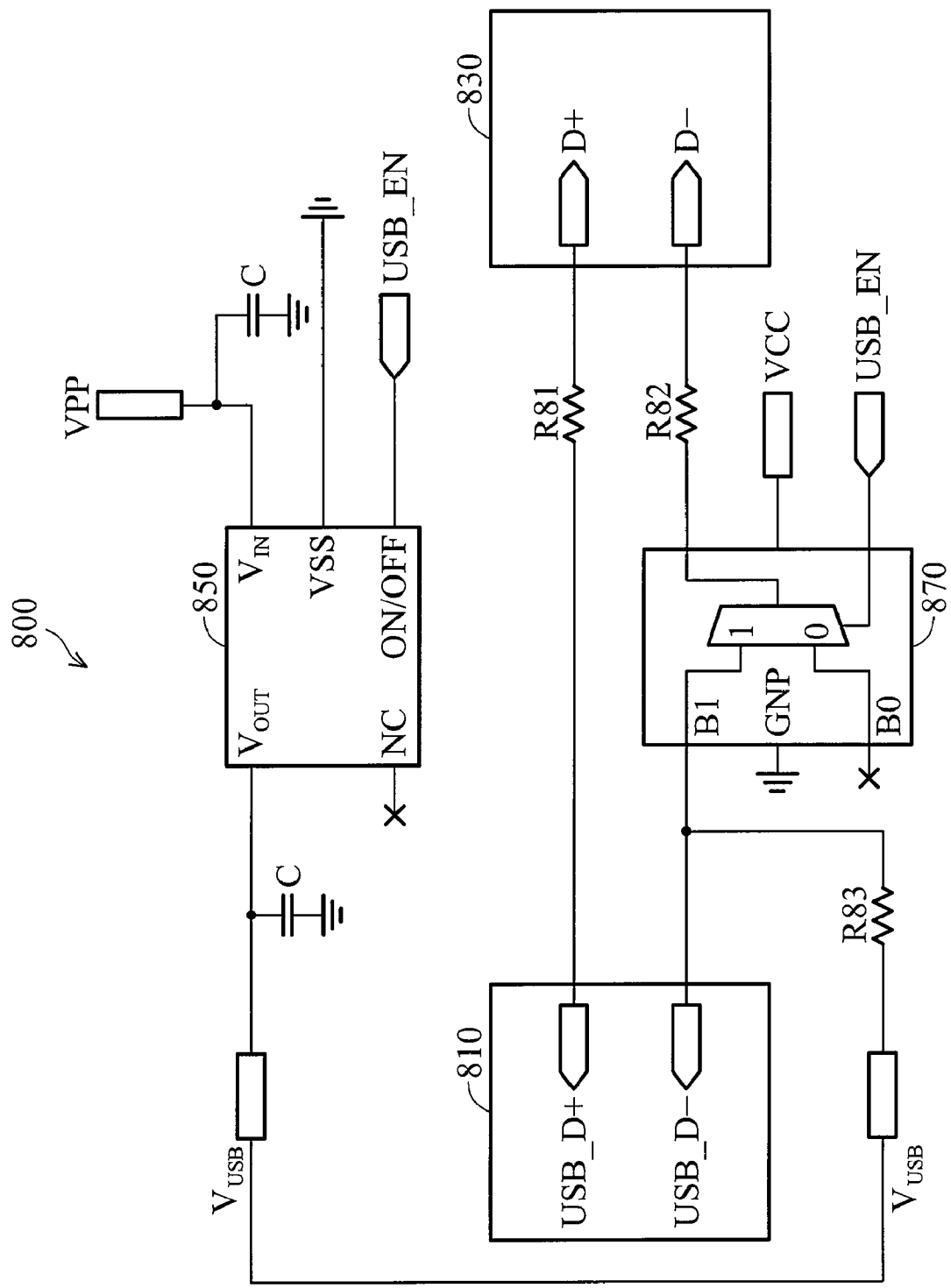

FIG. 12 is a diagram of a fifth embodiment of the USB system 800. The differences from the third embodiment are described in the following. The switching device 870 is disposed between the USB controller 810 and the USB external connector 830, and selectively connects and disconnects the data line D− according to an enabling signal USB_EN. When the enabling signal USB_EN is set to high (i.e. enabling USB device), the switching device 870 connects the data line D−, thereby the computer host (e.g. 130 of FIG. 2a) recognizes that a low-speed USB device (e.g. 200 of FIG. 2a) has been plugged in. When the enabling signal USB_EN is set to low (i.e. enabling USB device), the switching device 870 disconnects the data line D−, thereby the computer host (e.g. 130 of FIG. 2a) recognizes that a connected low-speed USB device (e.g. 200 of FIG. 2a) has been removed. FIG. 13 is a diagram of a sixth embodiment of the USB system 800. In the sixth embodiment, the switching device 870 and the resistor R83 are combined into the controller side.

Figure 14:
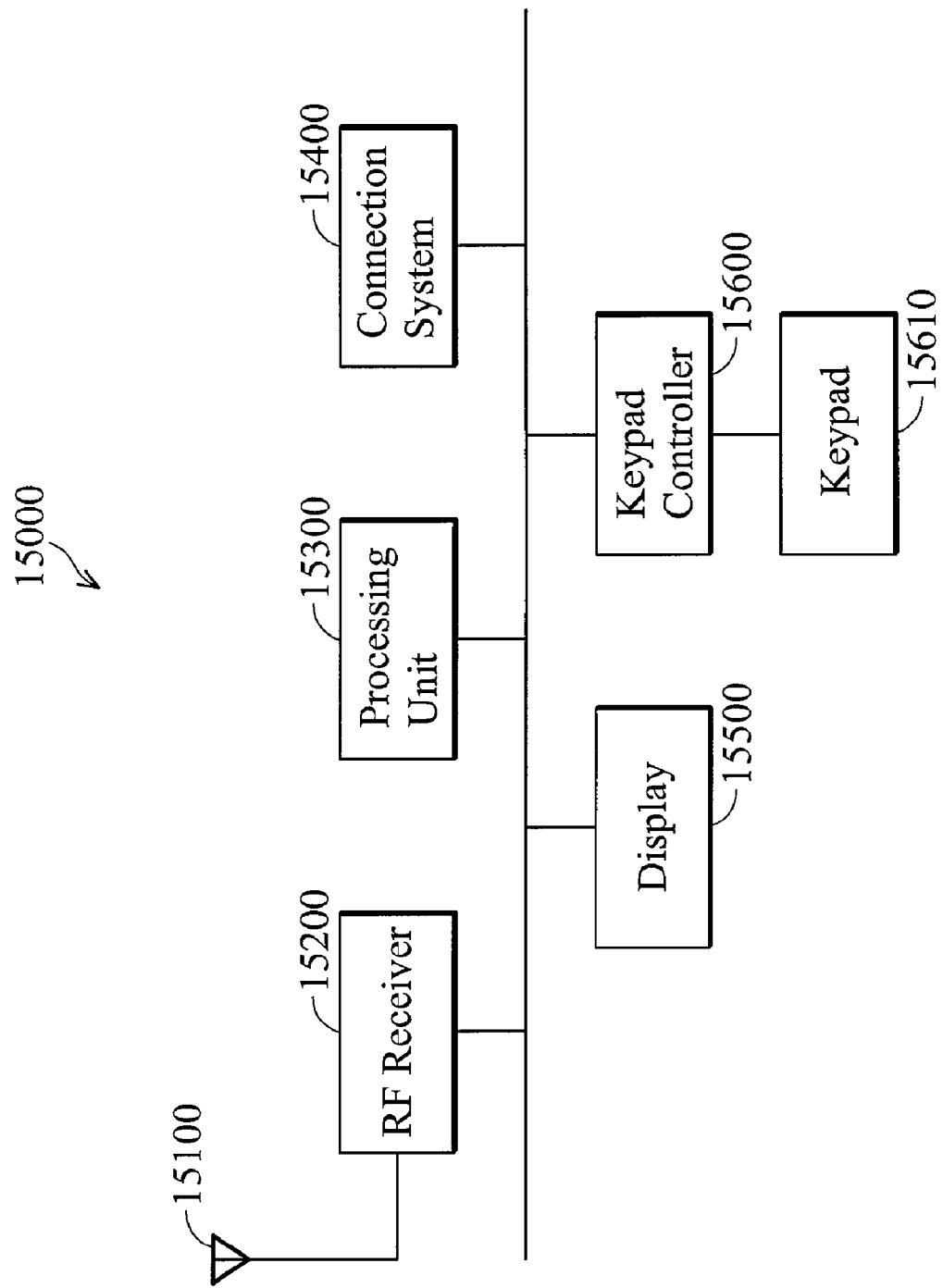
FIG. 14 is a diagram of the system architecture of an embodiment of a mobile phone.

FIG. 14 is a diagram of the system architecture of an embodiment of a mobile phone (e.g. 200 of FIG. 2a or 2b) comprising a radio frequency (RF) transceiver 15200 connecting to an antenna 15100, a processing unit 15300, a connection system 15400, a display 15500 and a keypad controller 15600 connecting to a keypad 15610. The processing unit 15300 connects to the radio frequency (RF) transceiver 15200, connection system 15400, display 15500 and keypad controller 15600 via buses and performs methods for selectively activating one of multiple functions provided by the mobile phone (e.g. FIGS. 4a and 4b). Referring to step S510 of FIG. 4a, that the mobile phone has been connected to a computer host may be detected via the connection system 15400. The connection system 15400 may be implemented in the described USB system 800 (FIG. 8, 9, 10, 11, 12 or 13). Referring to steps S520, S560 and S950 of FIGS. 4a and 4b, the menu and dialog box may be displayed on the display 15500. Referring to steps S530, S910 and S950 of FIGS. 4a and 4b, the key press event may be detected via the keypad controller 15600. Referring to steps S540, S940 and S970 of FIGS. 4a and 4b, the connection and disconnection signals and the device function description may be transmitted via the connection system 15400. Referring to steps S550 and S980 of FIGS. 4a and 4b, the configured module may be executed in the processing unit 15300.

Methods for selectively activating functions provided by a mobile phone, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for selectively activating one of a plurality of functions provided by a portable device, the method executed by the portable device, and comprising:
the portable device detecting that it has been coupled to a computer system;
the portable device displaying a first interface to facilitate selection of one function from the functions, wherein the first interface comprises a menu showing a plurality of menu items each corresponding to one function that the portable device supports;
detecting that one function is selected as a first function by the first interface of the portable device;
configuring at least one software module to activate the first function;
the portable device directing the computer system to activate a first driver in order to employ the portable device as a first external electronic device corresponding to the first function;
the portable device displaying a second interface to facilitate switching activation of a second function of the functions by the portable device after the first function is activated, wherein the second interface comprises the menu;
detecting which function is selected as a second function by the second interface of the portable device;
reconfiguring the software module to stop the first function and activate the second function; and
directing the computer system to deactivate the first driver in order to employ the portable device as a second external electronic device corresponding to the second function by the portable device.

2. The method as claimed in claim 1 further comprising:
transmitting information indicating the selection of the first function to the computer system,
thereby directing the computer system to activate a first driver corresponding to the first function.

3. The method as claimed in claim 1 wherein the portable device connects to the computer system via a universal serial bus (USB) link.

4. The method as claimed in claim 3 wherein detecting that the portable device has been coupled to the computer system is accomplished by detecting high voltage at a pin of the USB link.

5. The method as claimed in claim 3 wherein a disconnection signal is generated and transmitted by pulling low a data line of the USB link, and a connection signal is generated and transmitted by pulling high a data line of the USB link.

6. The method as claimed in claim 5 wherein the information indicating the selection of the first function or second function is carried by at least one descriptor compatible with the USB specification.

7. The method as claimed in claim 1 wherein the external electronic device is a mass storage device, a Webcam, a digital TV receiver, a Bluetooth transceiver, or a virtual communications port (comport).

8. An apparatus, comprising:
a connection device;
a display; and
a processing unit coupled to the display and the connection device, detecting that the apparatus has been coupled to a computer system via the connection device, displaying a first interface on the display of the apparatus to facilitate selection of a first function from a plurality of functions, detecting that the first function is selected by the first interface, and configuring at least one software module executed therein to activate the first function,
wherein the apparatus directs the computer system to employ the apparatus as a first external electronic device corresponding to the first function;
wherein the processing unit displays a second interface to facilitate activation of a second function of the plurality of functions by the apparatus after the first function is activated; wherein the processing unit detects which function is selected as a second function by the second interface of the apparatus; wherein the processing device reconfigures the at least one software module to stop the first function and activate the second function; and wherein the processing unit directs the computer system to switch to employ the apparatus as a second external electronic device corresponding to the second function.

9. The apparatus as claimed in claim 8 wherein the processing unit transmits information indicating the selection of the first function to the computer system via the connection device, thereby directing the computer system to activate a first driver corresponding to the first function.

10. The apparatus as claimed in claim 8 wherein the apparatus connects to the computer system via a universal serial bus (USB) link.

11. The apparatus as claimed in claim 10 wherein the processing unit detects that the apparatus has been coupled to the computer system via the connection device by detecting high voltage at a pin of the USB link.

12. The apparatus as claimed in claim 10 wherein the processing unit generates and transmits a disconnection signal by instructing the connection device to pull low a data line of the USB link, and generates and transmits a connection signal by instructing the connection device to pull high a data line of the USB link.

13. The apparatus as claimed in claim 12 wherein the information indicating the selection of the first function or second function is carried by at least one descriptor compatible with USB specification.

14. The apparatus as claimed in claim 10 wherein the connection device comprises: a USB controller; an external USB connector; a USB data line connected from the USB controller to the external USB connector; and a regulator disposed between a power source and the USB data line, receiving an enabling signal from the processing unit, and selectively converting the power source to a voltage level or not, according to the received enabling signal, a connection signal is transmitted when converting the power source to the voltage level, and a disconnection signal is transmitted when not converting the power source to the voltage level.

15. The apparatus as claimed in claim 14 wherein the connection device further comprises:

a switching device disposed between the USB controller and the external USB connector, selectively connecting and disconnecting the data line according to the enabling signal;

wherein the connection signal is transmitted when connecting the data line, and the disconnection signal is transmitted when disconnecting the data line.

16. The apparatus as claimed in claim 8 wherein the external electronic device is a mass storage device, a Webcam, a digital TV receiver, a Bluetooth transceiver, or a virtual communications port (comport).

* * * * *